United States Patent [19]
Goldman

[11] Patent Number: 4,734,695
[45] Date of Patent: * Mar. 29, 1988

[54] SECURE CARD AND SENSING SYSTEM

[75] Inventor: Robert N. Goldman, Kailua, Hi.

[73] Assignee: Light Signatures, Inc., Los Angeles, Calif.

[*] Notice: The portion of the term of this patent subsequent to Oct. 9, 2001 has been disclaimed.

[21] Appl. No.: 900,660

[22] Filed: Aug. 25, 1986

Related U.S. Application Data

[60] Division of Ser. No. 657,849, Oct. 4, 1984, Pat. No. 4,656,473, which is a continuation-in-part of Ser. No. 503,392, Jun. 10, 1983, Pat. No. 4,476,468, which is a continuation-in-part of Ser. No. 276,282, Jun. 22, 1981, Pat. No. 4,423,415, which is a continuation-in-part of Ser. No. 161,838, Jun. 23, 1980, abandoned.

[51] Int. Cl.$^4$ .................... H04Q 9/00; G06K 5/00
[52] U.S. Cl. .................... 340/825.340; 235/380; 350/347 R
[58] Field of Search ............. 340/825.34, 347 R; 235/469, 487, 380, 468, 457; 382/17; 350/3.61, 347 R, 347 V

[56] References Cited

U.S. PATENT DOCUMENTS

| | | | |
|---|---|---|---|
| 4,249,827 | 2/1981 | DiMatteo et al. | 382/17 |
| 4,476,468 | 10/1984 | Goldman | 340/825.34 |
| 4,568,141 | 2/1986 | Antes | 350/3.61 |
| 4,630,845 | 12/1986 | Sanner | 340/825.34 |
| 4,661,983 | 4/1987 | Knop | 340/825.34 |
| 4,671,618 | 6/1987 | Wu et al. | 350/347 V |

Primary Examiner—Donald J. Yusko
Attorney, Agent, or Firm—Nilsson, Robbins, Dalgarn, Berliner, Carson & Wurst

[57] ABSTRACT

An identification card is disclosed as for supporting commercial or other significant transactions involving a designated subject. The card incorporates a machine-readable record and is produced with an individual birefringent characteristic to modulate a light beam for card identification. In one embodiment, the card incorporates apparent stress waves to modulate an orientation-frequency characteristic (e.g. polarization angle) of a light beam. The machine-readable record on the card indicates the characteristic birefringence for confirming the card to be authentic. Methods are disclosed for producing and testing the cards. A system is disclosed for sensing card characteristics by modulated light including polarized light techniques to record and verify the cards with allowance for changes, as by card aging.

5 Claims, 8 Drawing Figures

SECURE CARD AND SENSING SYSTEM

A divisional application of U.S. Pat. No. 4,656,473, issued Apr. 7, 1987, from an application, Ser. No. 657,849, filed Oct. 4, 1984, and entitled "Secure Card and Sensing System" which was a continuation-in-part of U.S. Pat. No. 4,476,468, issued Oct. 9, 1984, from an application, Ser. No. 503,392, filed June 10, 1983, and entitled "Secure Transaction Card and Verification System" which was a continuation-in-part of U.S. Pat. No. 4,423,415, issued Dec. 27, 1983, from an application, Ser. No. 276,282, filed June 22, 1981, and entitled "Non-Counterfeitable Document System" which was a continuation-in-part of an application, Ser. No. 161,838, filed June 23, 1980, and entitled "Non-Counterfeitable Document System", now abandoned.

BACKGROUND AND SUMMARY OF THE INVENTION

In recent years there has been a gaining effort to establish a so-called "cashless society". One aspect of that effort has involved a steady increase in the use of personal devices, usually in the form of cards, to authorize or support various significant transactions. For example, cards are widely used in the forms of identification cards or transaction cards, specifically employed for credit cards, debit cards, cash cards, value cards, banking cards and so on. Classifications and standard definitions of such cards are sometimes ambiguous and volatile.

Although various card structures have been proposed in the past, along with various forms of processing systems, a need continues to exist for a reliable, economical, and practical transaction card along with similarly effective systems for producing such cards and regulating their use.

Many forms of transaction cards are used in environments where some opportunity exists to visually inspect the cards as they are used. For such applications, the requirements of a so-called non-counterfeitable card are rather different than those applications for such a card where there is no opportunity for visual inspection, as in the case of automatic teller machines. Essentially, fraudulent cards are easier to use if the counterfeit need not pass a visual inspection. Consequently, in applications where transaction cards are not visually inspected, another dimension is added to the problem of detecting counterfeits. Specifically in that regard, it has been proposed to utilize a medium in a card that alters the orientation-frequency property of a scanning light beam in a pattern that will characterize the card, as disclosed in the referenced copending parent application, now U.S. Pat. No. 4,476,468. Such a card is not susceptible to photo-reproduction.

Accordingly, the modulating stripe of cards of the present invention modulate the orientation or frequency properties of the light, wherein such properties involve polarization, color, and phase but exclude intensity or amplitude. Cards, and the like, of this invention, regarding this structural configuration, include an orientation-frequency property modulating stripe or area as distinct from documents that simply modulate the intensity of light.

To consider an example, a card may modulate the polarization angle of a light beam to provide identification. Such identification is not susceptible to duplication as by photo-reproduction. Accordingly, the present invention is directed to a form of authenticator device which may be incorporated in various records, diskettes, or other structures collectively termed cards herein.

As previously proposed, orientation-frequency cards may incorporate a modulating stripe of crystals contained in a carrier medium. While such structures are effective, individual crystals normally produce very sharp discrete changes in a scanning light beam. Consequently, sensing systems for operation with such cards must be capable of high accuracy. Generally, the cost of such apparatus increases with such demands. Consequently, a need exists for transaction cards of a medium that is capable of altering an orientation-frequency property of a scanning light beam in a characteristic pattern, and in which the changes are somewhat gradual to accommodate the use of relatively low precision sensing apparatus. Additionally, a need exists for such a card that can be inexpensively produced.

Another problem attendant the use of verifiable documents, e.g. transaction cards, involves document aging. Specifically, as a document or card is carried and used over a period of time, it may become soiled, bent, scratched, marred or otherwise altered to change its effect on impinging radiation. Consequently, a need exists for a system in which the aging effects on a document are somewhat compensated or corrected.

In general, the present invention is based on recognizing the above considerations and implementing cooperative elements to afford an effective, economical, and practical document or transaction card for verification and use in combination with an effective card processing system. Particular concerns are for an economical, durable card that may be used in cooperation with apparatus of relatively low cost both for production and verification.

The disclosed embodiment, in accordance with the present invention, incorporates a document in sheet form for verification use. The document or card includes a reference medium having a random variable pattern to modulate a beam of light applied to the sheet as when the beam scans an area of the sheet. In the disclosed embodiment, the card is formed to produce a frequency-orientation characteristic pattern, e.g. stress waves, in a plastic medium, which pattern defines somewhat gradual transitions. Light modulated by the card is reduced to an analog signal unique to each specific document. The analog is quantized and converted to a digital representation. This representation is referenced on the card in a machine-readable form. With such information, the verification system tests the recorded representation with freshly observed data. Also in accordance herewith, a plurality of sensed values are combined, as in ratio relationships to somewhat cancel the effects of aging.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, a detailed illustrative embodiment of the present invention is disclosed herein. However, physical identification media, light-modification media, data formats, and operating systems structured in accordance with the present invention may be embodied in a wide variety of different forms some of which may be quite different from those of the disclosed embodiments. Consequently, the specific structural and functional details disclosed herein are merely representative; yet in that regard, they are deemed to afford the best embodiments for purposes of disclosure and to provide the basis for the claims herein which define the scope of the present invention.

Figure 1:
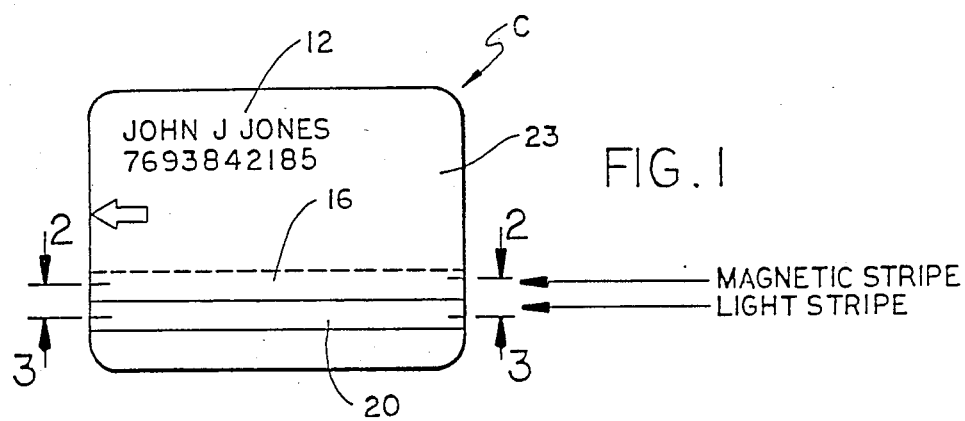
FIG. 1 is a plan view of a card in accordance with the present invention implemented for use in a system in accordance with the present invention.

Referring initially to FIG. 1, a card C is illustrated which is relatively secure to support transactions; which ages well in operation and may be used in cooperation with relatively low-cost sensing structure. The card C may be adapted as a verifiable document in a multitude of specific applications. For example, the card C might establish a basis for a debit or credit purchase or serve as a personal identification.

Considering the card C in detail, it carries print 12 (upper left) indicating the name of the designated bearer along with his assigned number. The print 12 may be variously printed or embossed on the card.

As indicated in FIG. 1, two bands or stripes are indicated on the card C. The functions of the stripes are interrelated and involve the verification or authentication of the card as genuine. Generally, such data as personal identification on the assigned user along with certain verification data is recorded on a magnetic stripe 16. A light stripe 20 contains the individual characteristic of the card C in the form of a random pattern to alter an orienation-frequency property of impinging light.

The magnetic stripe 16 is self-clocking as well known in the art. Also in a sense, the stripe 16 clocks the signal observed from the light stripe 20. That is, the magnetic stripe 16 designates selected locations to be sampled along the stripe 20 for an identification characteristic.

Considering the structure of the card C in somewhat greater detail, reference will now be made somewhat concurrently to FIGS. 1, 2, and 3. The body 22 of the card C comprises an integral sheet of solid synthetic material, which over its area variously modulates the orientation-frequency of an impinging light beam. The material of the body 22 defines a pattern of waves to modulate a scanning beam with regard to an orientation-frequency property. Such waves, as in the form of stress waves exist in synthetic materials, e.g. plastics, and define patterns that alter an orientation-frequency property of light. Such waves are described and shown by photographs in a book "STRESS WAVES IN SOLIDS" by H. Kolsky, published in 1963 by Dover Publications, Inc. Details of an exemplary medium for the body 22 and the method of its manufacture are described below.

The face 23 of the card C as illustrated in FIG. 1 is covered with paint 25, except at the area of the stripe 20. The opposed side (back) of the card C is also painted except for the areas of the stripes 16 and 20. That is, the light stripe 20 is unobstructed on either side (FIG. 3) while the magnetic stripe 16 may be aligned with a painted area on the opposite side of the card (FIG. 2).

Various indicia may be on the card C as by use of a variety of paints or other mediums applied as indicated above, so as to not interfere with the operation of the magnetic stripe 16 or the light stripe 20.

In the disclosed embodiment, the wave pattern in the light stripe 20 variously modulates the angle of polarization of a light scansion over a portion of its area. The modulated light beam thus manifests a characteristic of the stripe 20 along its length.

While various crystals are known to possess the characteristic of revolving the polarization angle of plane polarized light, as significant here, the property also exists in various synthetic materials, e.g. as stress waves. In crystal structure, individual crystals of certain types have a so-called "clockwise" or "counterclockwise" characteristic for modifying polarized light. For example, sodium chlorate crystals possess such a characteristic as explained in substantial detail in a book entitled "CRYSTALS AND CRYSTAL GROWING" by Holden and Morrison, MIT Press, 1982. As recognized in the parent patent hereto, in a minute form such crystals may be randomly disposed in a layer to provide a modulating stripe. However, the pattern in such a stripe is quite sharply defined and normally requires precise sensing for reliable results.

Forms of synthetic solids also have been discovered to alter the orientation-frequency properties of impinging light in distinct patterns or waves. In accordance herewith, such patterns may be in a form for effective and economical sensing to afford a basis for verification of documents.

In the referenced book, "STRESS WAVES IN SOLIDS", photographs are reproduced of patterns in "Persplex" plate. The waves were produced by detonating a small charge of lead oxide at an edge of the plate while in a molten state. The production of random variable patterns might involve not one but a plurality of detonations or disturbances. For example, a useful form of random variable patterns has been accomplished by distributing small crystals in a molten synthetic material which react with the crystals to develop multiple waves. With a random dispersion of tiny crystals in the material, wave interferences set up individual random variable patterns to characterize individual sheets. Consider a specific example for forming synthetic-material sheets of blank authenticator devices which have induced patterns of birefringence.

Sheets of polyvinylchloride for use in accordance herewith have been formed by modification with urea. Specifically, polyvinylchloride was modified with 5-10% parts by weight of urea and formed into plaques of synthetic integral material, as for the cards C.

The following describes a specific formulation:
  90-95% parts by weight, polyvinylchloride (Occidental Oxyblend VEO-530-1)
  10-5% parts by weight, urea (Baker Reagent Grade)

The materials were blended on a 3"×7" electrically heated 2-roll mil. Roll speeds for blending were approximately 10 rpm for the front roll and 14 rpm for the back roll. The roll temperatures were in the range of 330-350 degrees F. Polyvinylchloride was added to the heated rolls and milled until it formed a continuous band around the rolls. The urea was added slowly, i.e., over a period of 3-5 minutes. This mixture of polyvinylchloride and urea was milled for an additional 1-2 minutes.

The blended material was removed from the mill in a sheet approximately 0.050"-0.075" thick and allowed to cool at room temperature. Plaques were compression molded in a 3"×3" frame mold. The mold charge was calculated to produce test plaques which were 0.010", 0.025", or 0.030" thick.

With 5-10 percent by weight of flash on the molding, the mold was brought to required molding temperature, approximately 320 degrees F., in a Preco hydraulic laboratory press (4" ram diameter). The mold was removed from the press, charged with urea modified polyvinylchloride, and returned to the press. When the mold recovered temperature, pressure of 20,000 lbs. (approximately 2,200 psi ram pressure) was supplied. The molding cycle was 1 minute during which the temperature might climb another 10-20 degrees F. After the 1-minute molding cycle, the mold was cooled in the press by the water-cooled press platens. Pressure was maintained throughout the approximately 30-minute cooling cycle. The plaque was removed from the mold when the temperature had fallen below 100 degrees F.

The blanks or plaques for cards C may be further processed by embossing, painting and applying magnetic stripes. Techniques and apparatus for accomplishing such operations are well known and widely practiced in the prior art.

Figure 4:
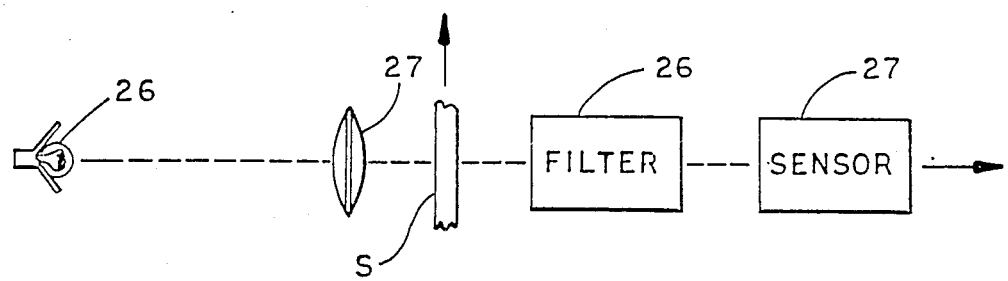
FIG. 4 is a diagrammatic view illustrating a technique as may be used in sensors of the present invention.

Referring to FIG. 4, a lamp 26 provides a light beam that is focused by a lens 27 to scan a relatively moving card along its light stripe S. In the embodiment of FIG. 4, the light stripe S has a random pattern of polarizing areas as described in the parent patent hereto. Consequently, light passing through the stripe S is polarization modulated according to the polarizing areas. That modulated light is then intensity modulated by a plane polarizing filter 26. The resulting light is sensed as an analog signal by a sensor 27 (photocell).

Thus, in passing through the stripe S, light is modulated with varying polarization. In an embodiment wherein the stripe S varies light frequency-orientation, the filter 26 functions with the sensor 27 to provide first an intensity modulated beam then an analog signal.

Figure 5:
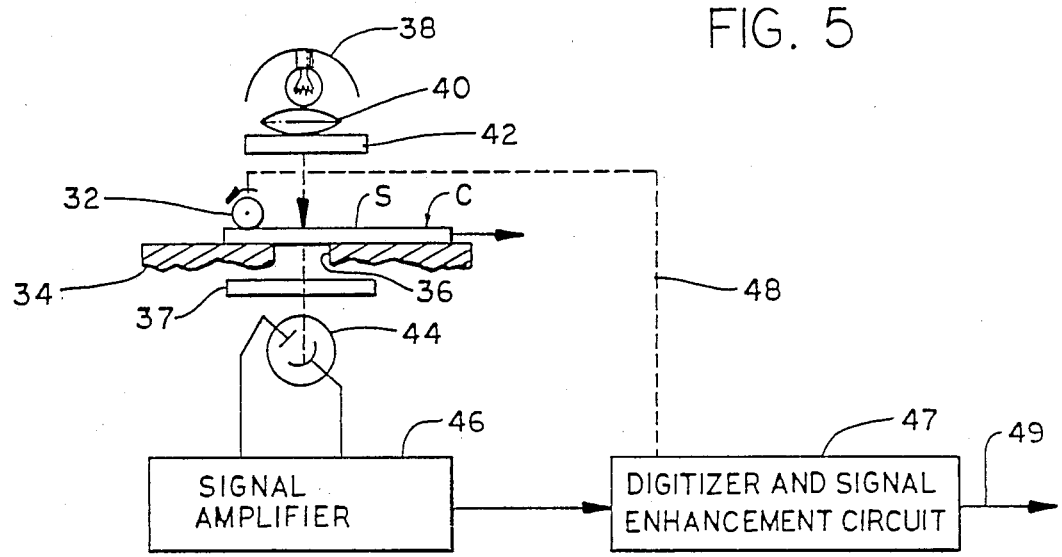
FIG. 5 is a diagrammatic view of another form of characteristic sensor as may be used in systems of the present invention.

Consider another form of sensor apparatus as illustrated in FIG. 5 along with certain card-handling apparatus. A card C having a stripe S as for randomly modifying a plane polarized beam by "clockwise" or "counterclockwise" changes is used. The card is actuated by a mechanical driver incorporating a roller 32 as well known in the prior art. The actuating apparatus moves the card C across a platform 34 defining an aperture 36. A beam of light from a light source 38 is focused by a lens 40 and passes through a filter or polarizing element 42. Accordingly, a focused, plane polarized beam of light is projected on the light stripe S of the card C. The random reaction to plane polarization along the stripe S polarity modulates the plane polarized light beam passing through the card C. Such polarity modulated light is passed through a polaroid filter 37 which passes only light of select range polarization. Accordingly, the polarity modulated light is filtered to produce intensity modulated light that is detected or sensed by a photocell 44. That is, the photocell 44 produces an analog signal representative of the intensity modulated light. The signal is amplified by an amplifier 46 and supplied to the circuit 47 to be enhanced and digitized. The representative modulated signal can be variously clocked in relation to motion of the card C or otherwise positionally related to card locations as disclosed in the referenced parent patent specification. In that regard, a coupling is indicated between the roller 32 and a circuit 47 by a dashed line 48. Position signals may also be developed from a parallel magnetic stripe 16 on the card C as well known in the magnetics art.

Recognizing the existence of various possibilities for the actual sensors and card light stripes as described with reference to FIGS. 4 and 5, it is also to be understood that sometimes desirable configurations utilize a plurality of sensors, as disclosed in the parent patent hereto. Specifically as disclosed therein, a pair of sensors are employed to produce two different aspects of the character of a light stripe. The two aspects provide a defense to the possible use of a photographically produced counterfeit, particularly with regard to system applications that accept cards without visual inspection. Such a counterfeit would not be operable to defraud a system utilizing multiple sensors for multiple aspects of the light stripe.

Still another objective can be accomplished using multiple sensors. Such a system can function effectively to process cards that have changed, as with age, by becoming clouded or scratched for example. Specifically, such a system will now be considered with reference to FIG. 6.

Figure 2:
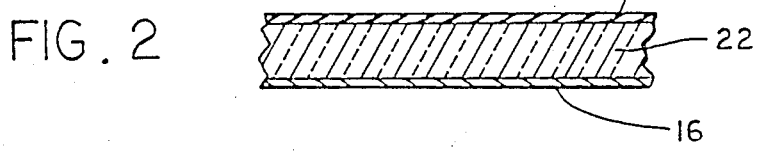
FIG. 2 is a sectional view taken along line 2—2 of FIG. 1.
Figure 3:
FIG. 3 is a sectional view taken along line 3—3 of FIG. 1.
Figure 6:
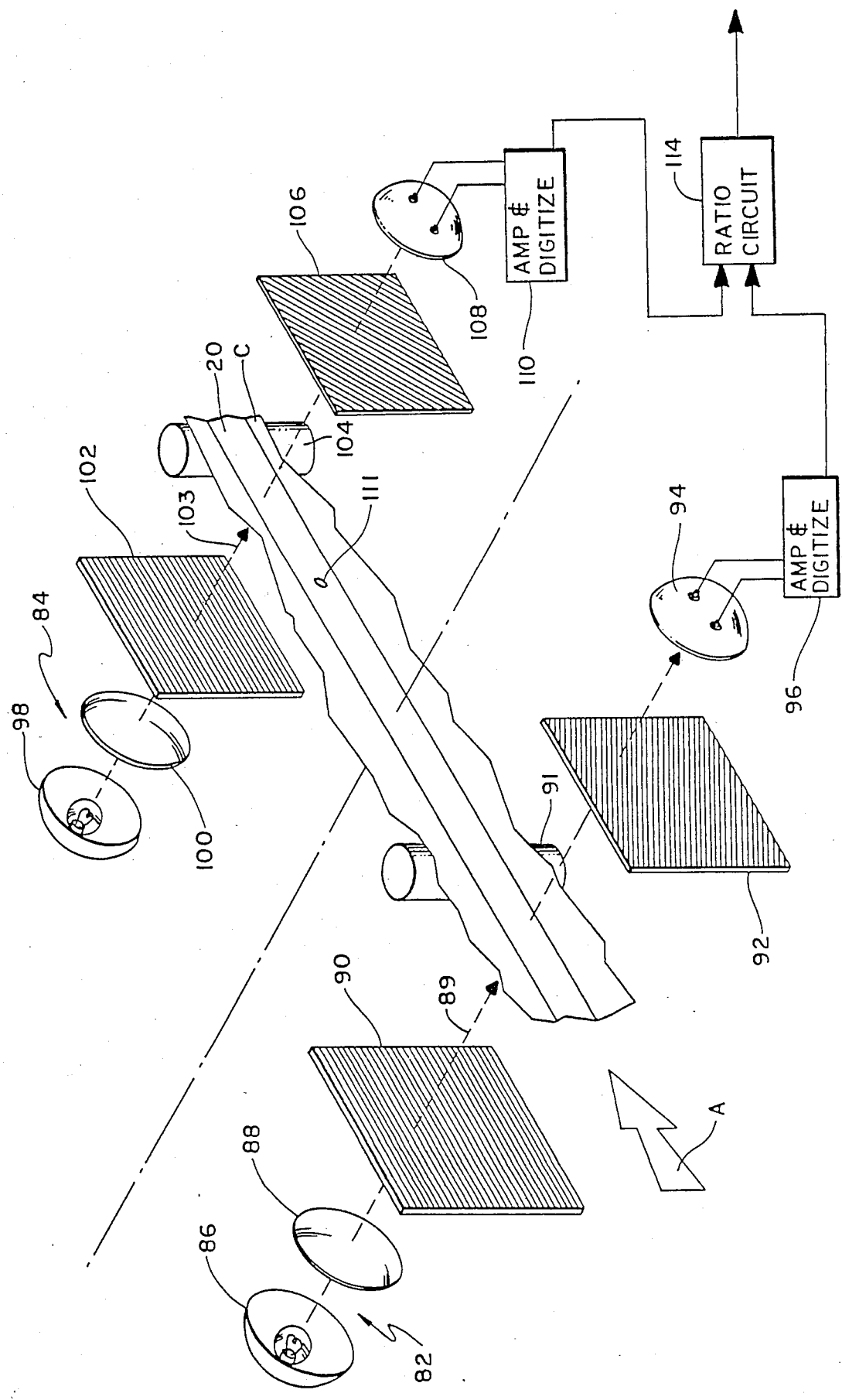
FIG. 6 is a diagrammatic view of a detailed card sensor system incorporating duality principles in accordance with the present invention.

In FIG. 6, sensors or scanners 82 and 84 operate with a card C as illustrated in FIGS. 1, 2, and 3 and wherein the light stripe 20 has the characteristic of randomly altering a beam of plane polarized light by "clockwise" or "counterclockwise" displacement as explained above. The sensors 82 and 84 sense the stripe 20 of the card C during a single pass. As will be described in detail below, the sensed characteristic signals are combined in ratio relationship to substantially offset the changes of card aging.

Figure 7:
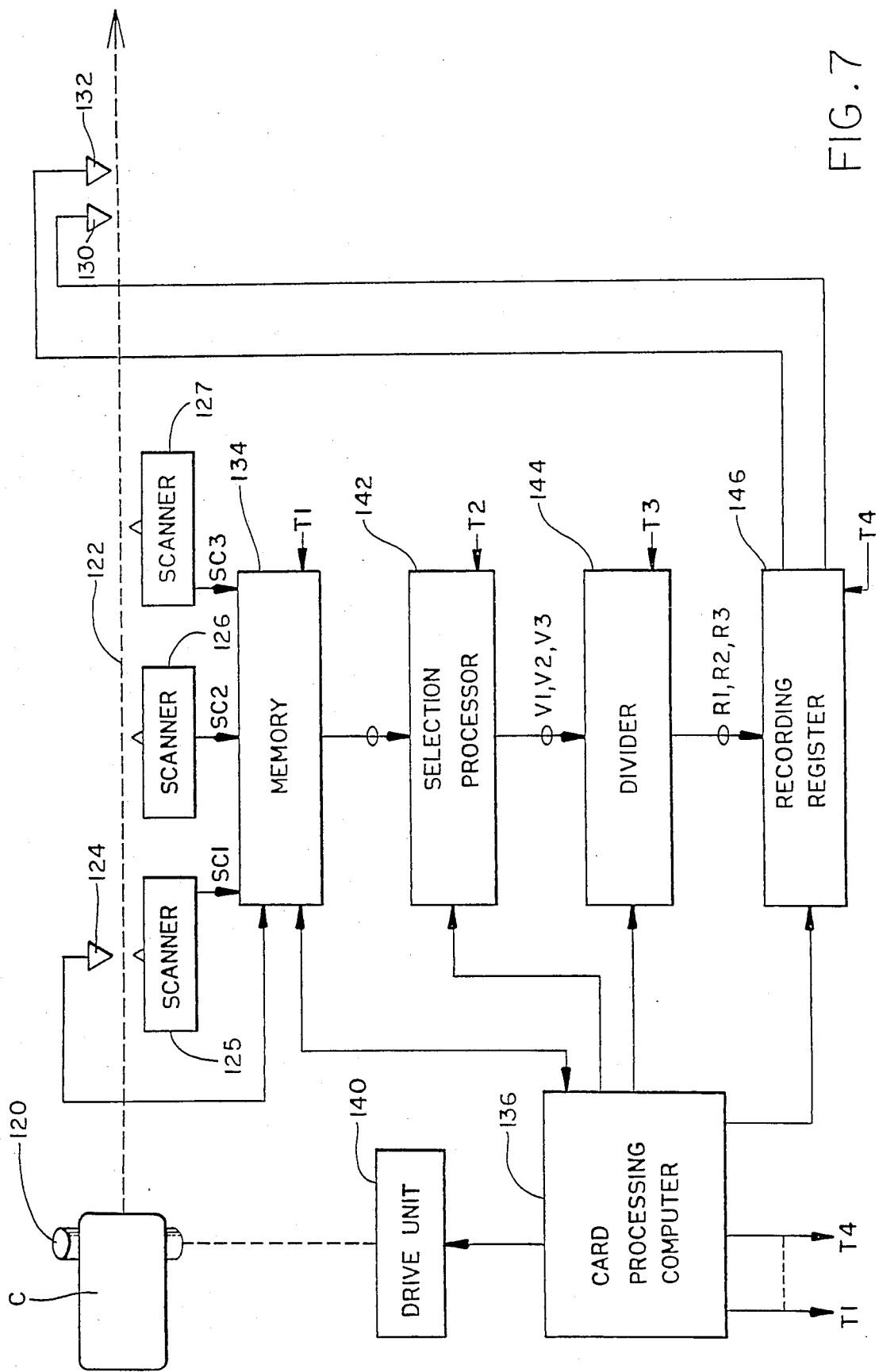
FIG. 7 is a diagrammatic view of a system for producing authenticator devices in accordance herewith.

A lamp 86 in the scanner 82 (forward) provides light that is concentrated by a lens 88 into a beam as illustrated. That beam passes through a plane polarizing filter 90 to provide a polarized beam 89 as represented in FIG. 7. Note that the plane of polarization for the beam 89 is represented to be substantially horizontal (see shading lines of filter 90).

The plane polarized beam 89 passes through the light-modulating stripe 20 of the card C. Note that the card C is moved relative to the beam 89 (arrow A) by a transport mechanism including a roller 91. In that way, the beam 89 scans the stripe 20. The individual areas of the stripe 20 effectively revolve, turn, or twist the plane polarized light of the beam 89 variously depending on their relative orientation property. Consequently, the light passing through the stripe 20 is no longer plane polarized but rather is randomly orientation modulated by the individual portions in the scanned area of the stripe 20.

The modulated light from the light stripe 20 impinges on a polaroid filter 92 which is disposed for plane polarization at an angle of about twenty degrees offset from the horizontal (see shading lines of filter 92). Consequently, the polaroid filter 92 passes a portion of the impinging randomly polarized light. As a result, randomly polarized light is converted to light that is intensity modulated for sensing. Thus, the filter 92 selects the light to be sensed by a photo-element 94 coupled to an amplifier and digitizer circuit 96. Accordingly, digital signal representations are provided to characterize the light stripe 20 in one dimension or sensing aspect.

The scanner 84 (right) is similar to the scanner 82 except that the secondary polaroid filter is disposed to pass light of a differently oriented plane polarization. The scanner 84 includes a lamp 98 to provide light through a lens 100 and a polaroid filter 102. Thus, a plane polarized beam 103 again is formed. Note that the polarized beam 103 is horizontally plane polarized similarly to the beam 89.

The polarized beam 103 passes through the light stripe 20 of the card C as the card is moved by the transport including a roller 104. Thus, the stripe 20 is again scanned by polarized radiation. However, the sensing aspect of the scanner 84 is different from that of the scanner 82.

The randomly polarized light emerging from the stripe 20 in the scanner 84 is selectively passed by a polaroid filter 106 with a polarizing plane offset substantially from that of the filter 92. The plane of polarization of the filter 106 is offset from the horizontal oppositely to the offset of the filter 92 to accomplish a different sensing aspect or dimension of sensing.

Light passing through the filter 106 is sensed by a photo-element 108 and the resulting signal is processed by a related amplifier and digitizer circuit 110. As the filter 106 is oriented at an angle offset from the filter 92, the two filters provide distinct modulated light patterns. Consequently, two different aspects or dimensions of the stripe 20 characteristic are observed and reduced to representative digital signals. As disclosed below, the two distinct aspect observations may be combined (ratioed together) to obviate card-aging changes and thereby provide more stable data from the card over extended periods of use.

Essentially, the operation of the system represented in FIG. 6 involves scanning a path along a portion of the area in the stripe 20 in two different aspects facilitated by using offset polaroid filters. Each of the similar beams 89 and 103 is modulated by the individual areas of the stripe 120. However, the offset polarity orientation of the two filters 92 and 106 provides two distinct intensity modulated beams for the photo-elements 94 and 108, as though the stripe 20 were viewed from two different aspects. The two observations can be combined to obviate certain card changes, as clouding, that may occur with aging and use.

Recapitulating to some extent, in the operation of the system of FIG. 6, the stripe 20 is scanned along substantially the same path by the scanners 82 and 84. For example, a designated sub-portion 111 of the stripe 20 is sensed first by the scanner 82 then by the scanner 84. The two observations of the sub-portion 111 are displaced in time; however, various time displacement devices are available. Using one technique in accordance herewith, the two observations are simply placed in memory for subsequent concurrent processing. In that regard, the data from the individual scannings may be indexed by various techniques that include well known clocking operations. Clock signals can be derived from the transport mechanism or index marks on the card. Details of such arrangements are well known and are described in detail in the above-referenced patents.

Continuing with the explanation as related to the elemental area or sub-portion 111 of the stripe 20, as the beams 89 and 103 are plane polarized, they emerge from the area 111 somewhat revolved. For example, assume that in passing through the sub-portion 111 the polarized light beams 89 and 103 are revolved clockwise as viewed from the sensor elements 94 and 108. Suppose for example that the degree of rotation is such that light passing through the sub-portion 111 aligns with the polarity plane of the filter 92. Consequently, when the area of the sub-portion 111 is aligned with the beam 89, polarized light passing through the sub-portion 111 aligns with the filter 92. Therefore, a major portion of the light modulated by the sub-portion 111 will pass through the filter 92 to be sensed by the photo-element 94. A different situation occurs when the area of the sub-portion 111 is exposed to the beam 103.

When the sub-portion 111 has moved to receive the polarized beam 103, the impinging polarized light will again be revolved to the plane of the filter 92. However, the passed light now impinges on the filter 106 which is substantially "closed" to light of that polarization. Consequently, the photo-element 108 receives relatively little illumination. Considering the excitation of the elements 94 and 108 on a scale of ten for the exemplary situation, the polarity modulation by the area sub-portion 111 might produce a value close to ten at the element 94 while producing a value of less than one at the element 108. Thus, the two observations are akin to two different dimensional aspects. Consequently, samples of the two analogs provide distinct digital values from the scanner circuits 96 and 110. The two values are processed and combined in a ratio circuit 114 as will now be disclosed to provide a representative characteristic for the card involved.

Considering the operation of the system of FIG. 6 to compensate for aging of a card C, assume a specific example further to the above situation. Suppose that when the card C is new, sensing the area sub-portion 111 provides readings of 9.9 and 0.9 (scale of ten) as represented by digital values from the circuits 96 and 110 respectively. The values might be ratioed by the circuit 114 in the form of a digital divider. Specifically:

9.9/0.9 = 11

Accordingly, eleven would be taken as a component of the characteristic value. Now assume that the card ages and as a result of scratches, dirt, clouding, marring, or the like, the observed signals are reduced by twenty percent. Accordingly:

9.9 − (0.20 × 9.9) = 8.92, rounding to 8.9

0.9 − (0.20 × 0.9) = 0.82, rounding to 0.8

Consequently, the ratio would be:

8.9/0.8 = 11.1, rounding to 11.

It is, therefore, apparent that even though the card has experienced a sensory change of twenty percent as a result of aging, for example, the developed characteristic at the elemental sub-portion 111 is still eleven. Accordingly, card stability is high in spite of considerable physical change in the card. The desirable feature stems from ratioing the values of different dimensional observations.

To compound the functions of multi-aspect systems, more than two sensors can be utilized. A production system will now be described with reference to FIG. 7. A card C (upper left) is illustrated in conjunction with a transport mechanism represented simply by a roller 120. The card C may be produced as described above and incorporates a clock track recorded on the magnetic stripe 16.

Transport apparatus for cards and documents are very well known in the prior art and such systems are readily available to drive the card C along a path 122 as indicated by a dashed line. As the card moves along the path 122, several individual structures are fixed to sense the card C in transducing relationship.

From the position of the card C as illustrated in FIG. 7, moving to the right along the path 122, the magnetic stripe 16 of the card (not shown in FIG. 7) is sensed by a read head 124. Next, the light stripe 20 of the card (not illustrated in FIG. 7) is sensed in sequence by three scanners 125, 126, and 127. The individual scanners may take the form of the scanners 82 and 84 as represented in FIG. 6, each having a different aspect of observation. Essentially, the scanners 125, 126, and 127 sense the light stripe 20 in three separate dimensional aspects to provide representative digital signals SC1, SC2, and SC3, respectively.

Downstream in the path 122 from the last scanner 127, the magnetic stripe 16 is re-recorded and, accordingly, a pair of write heads 130 and 132 are mounted contiguous to the path 122.

As the card C traverses the path 122, a sequence of operations is performed. Specifically, the light stripe 20 of the card is sensed in three distinct dimensional observations (rather than the two observations as depicted in FIG. 6). The data from such observations is then reduced to specific samples (digital signals SC1, SC2, and SC3) which are combined in ratio relationships to provide representative characteristic signals as explained above which are recorded on the magnetic stripe 16 of the card. Other data also may be recorded on the card C as to identify the assigned user and perhaps indicate the status of certain transactions as explained in detail in the parent patent hereto.

The scanners 125, 126, and 127 supply the signals SC1, SC2, and SC3 to a memory 134 which is also connected to receive clock signals from the read head 124. The memory 134 is also connected to a card processing computer 136 which controls and sequences the various operations by a series of timing signals T1-T4. In that regard, the computer 136 is connected to each of the various operating units. Specifically, a drive unit 140 is connected to the computer 136 for actuating the roller 120 in controlled operating sequences. The computer 136 is also connected to a selection processor 142, a divider 144, and a recording register 146.

In view of the above introduction of the basic system components, the function and operation of the system of FIG. 7 may now best be understood by assuming the presence of a raw card C as illustrated, ready to be processed by the system into an operational document. In that regard, as indicated above the card C carries a prerecorded clock track on the magnetic stripe 16.

As the card C moves along the path 122, the read head 124 senses the clock track from the magnetic stripe 16. Note, for example, that predetermined clock signals may designate specific areas or sub-portions to be considered. Details of such an arrangement are disclosed in the referenced patent, U.S. Pat. No. 4,423,415, "Non-Counterfeitable Document System". Accordingly, the memory 134 is sequenced during a timing interval T1 to accept three sets of digital representations SC1, SC2, and SC3 manifesting the light stripe 20 as viewed in three different aspects or dimensions.

During a following interval (manifest by the signal T2), the selection processor 142 passes selected values of the signals SC1, SC2, and SC3 representative of specific area sub-portions in the light stripe 20 which may be considered as equating to the sub-portion 111 (FIG. 7). Accordingly, a set of three values for selected samples or sub-portions are supplied from the selection processor 142 to the divider 144 in the form of sets of signals V1, V2, and V3.

Under control of the computer 136, each set of signals V1, V2, and V3 is variously combined in a ratio relationship. For example, the combination may be performed by the divider 144 to accomplish the following ratioed signals:

$$V1/V2 = R1$$

$$V2/V3 = R2$$

$$V3/V1 = R3$$

Accordingly, signals manifesting different dimensional observations of each area sub-portion are ratioed together to accomplish ratioed signals R1, R2, and R3 which, as explained above, are substantially immune to certain aging effects of the card C.

The representative ratioed values manifest by signals R1, R2, and R3 are supplied from the divider 144 during the interval of timing signal T3. Accordingly, the sets of signals R1, R2, and R3 are received in a recording register 146 preparatory to recording the identification data on the magnetic stripe 16.

As suggested above, the card processing computer 136 may supply additional data to be magnetically recorded on the card. In that regard, the computer 136 may include various input and control apparatus to assemble a record in the register 146 as a buffer, indicative of the actual recording format for the stripe 16. Along with such other data as may be pertinent in various applications of the system, the data manifest by the signals R1, R2, and R3 is recorded on the magnetic stripe 16. Such signals will be read subsequently and compared with developed signals derived from data freshly sensed from the light stripe just as explained above.

During the interval of timing signal T4, the recording register 146 drives the magnetic write heads 130 and 132. Consequently, data including ratioed values R1, R2, and R3 developed from observations of the light track 20 is magnetically recorded to provide a record for future comparison with subsequently sensed and developed data. Thus, the card C is processed as an operative document, with the magnetic stripe 16 including a record of ratioed values characteristic of specific sub-portion areas in the light stripe 20.

As suggested above, the card C may take a variety of forms for use in a variety of applications where it is important to confirm the card as genuine. The test for authenticating the card C involves equipment substantially as described above further incorporating comparison apparatus as disclosed in the above-referenced U.S.

Figure 8:
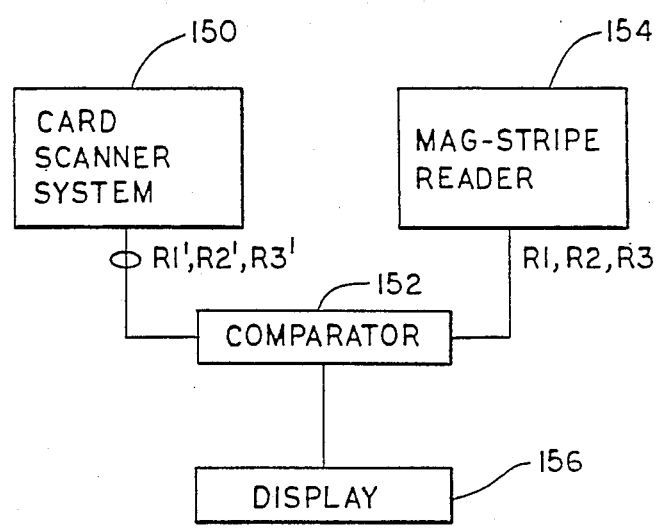
FIG. 8 is a block diagram of a system for verifying authenticator devices in accordance herewith.

Pat. No. 4,423,415. Specifically, the configuration of the authentication apparatus may take the form as illustrated in FIG. 8. A card scanner system 150 incorporates structure substantially as represented in FIG. 7 to provide the signals R1', R2', and R3'. As described, such signals are developed from freshly sensed multidimensional observations of the light stripe 20. They are supplied to a comparator 152. Independently, a magnetic stripe reader 154 senses the magnetic stripe 16 providing substantial data including the previously observed and recorded signal representations R1, R2, and R3. Such signals were recorded, as by using a system as represented in FIG. 7.

The signals R1, R2, and R3 from the magnetic stripe 16 are compared by the comparator 152 with the freshly sensed and developed signals R1', R2', and R3' observed from the light track 20. The results of the comparison are then manifest by a display unit 156.

Essentially, within the realm of system tolerances, the display 156 generally indicates either a favorable or an unfavorable comparison between the sets of signals R1, R2, R3 and R1', R2', and R3'. Of course, signals manifesting a favorable comparison may simply approve a transaction or may be variously applied as to actuate any of a variety of operations within a system incorporating the present invention.

In general, the system of the present invention includes an improved authentication device as in the form of a card or any other document, which incorporates an orientation-frequency, light modulating medium in a changing pattern (birefringent). The medium may take the form of synthetic material in accordance herewith. Essentially, the blank authenticator is completed for use by sensing and recording the medium and providing a record thereof for future comparison. The system of the present invention further contemplates an improved system of data development wherein individually observed light-modulation signals are ratioed together in a manner to reduce the effect of document aging. Accordingly, the present invention is capable of several formats and may be variously constructed using implementations substantially different from the specific details disclosed herein. Accordingly, the present invention is deemed to be defined in accordance with the claims as set forth below.

What is claimed is:

1. An authenticator device for machine sensing, as to control or regulate transactions or operations, comprising:

a card in a sheet form and including a medium in at least a certain area thereof comprising a synthetic integral material for altering an orientation-frequency property of impinging light in a random characteristic pattern over said area and accordingly to modulate the orientation-frequency property of light impinging a select portion of said area; and a record associated with said card indicative of the orientation-frequency altering property of said medium for said select portion of said area usable to verify said authenticator device as genuine.

2. An authenticator device according to claim 1 wherein said card comprises a sheet of birefringent synthetic material and further includes a record means affixed thereon to carry said record indicative of said property.

3. An authenticator device according to claim 1 wherein said card comprises a sheet of birefringent synthetic material and further includes a paint substance disposed on said sheet to define said certain area.

4. An authenticator device according to claim 1 wherein said card comprises a sheet of birefringent synthetic material and further includes a magnetic stripe affixed thereon to carry said record and a paint substance disposed on said sheet to define said certain area.

5. An authenticator according to claim 1 wherein said card comprises a sheet of embossable material.

* * * * *